US010896276B2

(12) United States Patent
Chi et al.

(10) Patent No.: US 10,896,276 B2
(45) Date of Patent: Jan. 19, 2021

(54) TIMING ESIMATION METHOD AND SIMULATOR

(71) Applicant: INDUSTRIAL TECHNOLOGY RESEARCH INSTITUTE, Hsinchu (TW)

(72) Inventors: Mei-Ling Chi, Kaohsiung (TW); Yao-Hua Chen, Changhua County (TW); Hsun-Lun Huang, Taichung (TW); Juin-Ming Lu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 462 days.

(21) Appl. No.: 15/843,375

(22) Filed: Dec. 15, 2017

(65) Prior Publication Data

US 2018/0357337 A1 Dec. 13, 2018

(30) Foreign Application Priority Data

Jun. 7, 2017 (TW) .............................. 106118944 A

(51) Int. Cl.
*G06F 30/3323* (2020.01)
*G06F 13/16* (2006.01)
(Continued)

(52) U.S. Cl.
CPC ........ *G06F 30/3323* (2020.01); *G06F 13/161* (2013.01); *G06F 13/1642* (2013.01);
(Continued)

(58) Field of Classification Search
CPC ............. G06F 30/3323; G06F 30/3312; G06F 13/161; G06F 13/1642; G06F 13/28; G06F 2119/12; G06F 1/28
(Continued)

(56) References Cited

U.S. PATENT DOCUMENTS 8,122,398 B2 2/2012 Veller et al.
8,244,512 B1 * 8/2012 Tseng .................... G06F 30/331
703/14
(Continued)

FOREIGN PATENT DOCUMENTS

CN 101482891 A 7/2009
CN 102339343 A 2/2012
(Continued)

OTHER PUBLICATIONS

Yu-Tsao Hsing et. al., SDRAM Delay Fault Modeling and Performance Testing, 25th IEEE VLSI Test Symmposium (VTS'07), pp. 1-6 (Year: 2007).*
(Continued)

*Primary Examiner* — Justin C Mikowski
(74) *Attorney, Agent, or Firm* — Maschoff Brennan

(57) ABSTRACT

Disclosed are a timing estimation method and a simulator. The method is applied to a function verification model. In the method, the model issues a first access issue at a first time point; receives a first response to the first access issue from the bus at a second time point; calculates a delay time between the first and second time points; determines whether the delay time is longer than or substantially equal to a transmission time corresponding to the first access issue; issues a second access issue if yes; and issues the second access issue in a compensation time counting from the second time point if not. The compensation time is not longer than the difference between the transmission time and the delay time.

8 Claims, 7 Drawing Sheets

(51) Int. Cl.
*G06F 13/28* (2006.01)
*G06F 30/3312* (2020.01)
*G06F 1/28* (2006.01)
*G06F 119/12* (2020.01)

(52) U.S. Cl.
CPC .......... *G06F 13/28* (2013.01); *G06F 30/3312* (2020.01); *G06F 1/28* (2013.01); *G06F 2119/12* (2020.01)

(58) Field of Classification Search
USPC .......................................................... 703/14
See application file for complete search history.

(56) References Cited

U.S. PATENT DOCUMENTS

| | | | |
|---|---|---|---|
| 8,543,367 | B1 | 9/2013 | Van Rompaey et al. |
| 2005/0039156 | A1 | 2/2005 | Catthoor et al. |
| 2005/0071145 | A1* | 3/2005 | Sakiyama ............... G06F 30/33 703/19 |
| 2005/0102125 | A1* | 5/2005 | Tseng ..................... G06F 13/22 703/14 |
| 2006/0080076 | A1 | 4/2006 | Lahiri et al. |
| 2009/0083372 | A1* | 3/2009 | Teppler ................. H04L 9/3226 709/203 |
| 2009/0164681 | A1* | 6/2009 | Elhamias .............. G06F 13/385 710/117 |
| 2009/0204380 | A1 | 8/2009 | Kato et al. |
| 2010/0204975 | A1* | 8/2010 | Nakayama .............. G06F 30/33 703/20 |
| 2011/0307233 | A1* | 12/2011 | Tseng .................... G06F 30/331 703/14 |
| 2012/0017197 | A1 | 1/2012 | Mehta |
| 2012/0089385 | A1 | 4/2012 | Hsu et al. |
| 2012/0144216 | A1 | 6/2012 | Hsieh et al. |
| 2012/0185231 | A1 | 7/2012 | Lo et al. |
| 2012/0210055 | A1* | 8/2012 | Mace .................... G06F 1/3225 711/105 |
| 2013/0124885 | A1 | 5/2013 | Davis et al. |
| 2014/0107999 | A1 | 4/2014 | Frenkil |
| 2014/0379307 | A1 | 12/2014 | Hutton et al. |
| 2015/0067634 | A1 | 3/2015 | Huilgol |
| 2015/0095010 | A1 | 4/2015 | Brock et al. |
| 2016/0085572 | A1 | 3/2016 | Hotra |

FOREIGN PATENT DOCUMENTS

| | | |
|---|---|---|
| CN | 105446795 A | 3/2016 |
| CN | 106201689 A | 12/2016 |
| TW | I427496 A | 4/2007 |
| TW | 201232408 A | 8/2012 |

OTHER PUBLICATIONS

Mikael Briday, Jean-Luc Bechennec and Yvon Trinquet, ReTiS: a Real-Time Simulation Tool for the Analysis of Distributed Real-Time Applications, IEEE, 2004, pp. 257-264 (Year: 2004).*
Duncan Clarke and Insup Lee, Automatic Test Generation for the Analysis of a Real-Time System: Case Study, IEEE, 1997, p. 112-124 (Year: 1997).*
Paul Rosenfeld, Elliott Cooper-Balis, Bruce Jacob, DRAMSim2: A Cycle Accurate Memory System Simulator, IEEE Computer Architecture Letters, vol. 10, No. 1, Jan.-Jun. 2011, pp. 16-19 (Year: 2011).*
Ling Shi and Yan Liu, Modeling and Verification of Transmission Protocols: A Case Study on CSMA/CD Protocol, SSIRI-C 2010—4th IEEE International Conference on Secure Software Integration and Reliability Improvement Companion. 143-149 (Year: 2010).*
TW Notice of Allowance dated Apr. 17, 2018 in application No. 106118944.
Hugo Lebreton, and Pascal Vivet, "Power Modeling in SystemC at Transaction Level, Application to a DVFS Architecture", VLSI 2008, Apr. 7-9, 2008.
Ikhwan Lee, Hyunsuk Kim, Peng Yang, Sungjoo Yoo, Eui-Young Chung, Kyu-Myung Choi, Jeong-Taek Kong, and Soo-Kwan Eo, "PowerViP: SoC Power Estimation Framework at Transaction Level", ASPCDA 2006, Jan. 24-37, 2006.
Nidhi Chandoke and Ashish Kumar Sharma, "A Novel Approach to Estimate Power Consumption using SystemC Transaction Level Modelling", INDICON 2015, Dec. 17-20, 2015.
Ons Mbarek, Alain Pegatoquet, Michel Auguin, and Houssem Eddine Fathallah, "Power-Aware Wrappers for Transaction-Level Virtual Prototypes: a Black Box Based Approach", VLSI design 2013, Jan. 5-10, 2013.
Rabie Ben Atitallah, mail Niar, and Jean-Luc Dekeyser, "MPSoC Power Estimation Framework at Transaction Level Modeling", ICM 2007, Dec. 29-31, 2007.
Sumit Ahuja, Deepak A. Mathaikutty, Gaurav Singh, Joe Stelzer, Sandeep K. Shukla, and Ajit Dingankar, "Power Estimation Methodology for a High-Level Synthesis Framework", ISQED 2009, Mar. 16-18, 2009.

* cited by examiner

TIMING ESIMATION METHOD AND SIMULATOR

CROSS-REFERENCE TO RELATED APPLICATIONS

This non-provisional application claims priority under 35 U.S.C. § 119(a) on Patent Application No(s). 106118944 filed in Taiwan, R.O.C. on Jun. 7, 2017, the entire contents of which are hereby incorporated by reference.

TECHNICAL FIELD

The disclosure relates to a timing estimation method and a simulator.

BACKGROUND

In the technology industry, the development of mobile devices or wearable devices is still a hot subject. Mobile devices or wearable devices require a light, thin, small size. For a relatively small device, the control of power consumption is very important.

Most present simulation or verification processes for the power consumption of multimedia devices put emphasis on large-size processing units, such as processors or memory. In fact, these processing units usually have self-contained time information, so it is relatively easy to reflect their power consumption. For small-size processing units, such as video processing units (VPU), and graphics processing units (GPU), etc., they usually employ one or more function models for simulation or verification and the models do not have self-contained time information, so reflecting their power consumption has a certain degree of difficulty. However, it may take several months to redevelop a model having self-contained time information for the simulation or verification of these small-size processing units; and to a considerable extent, this will influence the development schedule.

SUMMARY

According to one or more embodiments, the present disclosure provides a timing estimation method, applied to a function verification model. In the timing estimation method, a first access request of a function verification model is issued at a first time point. At a second time point, a first response to the first access request is received from a bus. A delay time between the first time point and the second time point is calculated. When the delay time is larger than a transmission time corresponding to the first access request, a second access request is issued. When the delay time is shorter than the transmission time corresponding to the first access request, the second access request is issued in a compensation time following the second time point. The compensation time is not larger than the difference between the transmission time and the delay time.

According to one or more embodiments, the present disclosure provides a timing estimation device. The timing estimation device is electrically connected to a processor and a memory. The processor drives a function verification model to issue a first access request at a first time point. The timing estimation device includes a delay simulation module and a processing time estimation module. The delay simulation module receives a first response to the first access request from a bus at a second time point. The delay simulation module calculates a delay time between the first time point and the second time point. The processing time estimation module determines whether the delay time is larger than a transmission time corresponding to the first access request. When the delay time is larger than the transmission time corresponding to the first access request, the processing time estimation module issues the second access request. When the delay time is not larger than the transmission time corresponding to the first access request, the processing time estimation module issues the second access request in a compensation time following the second time point. The compensation time is not larger than the difference between the transmission time and the delay time.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1A:
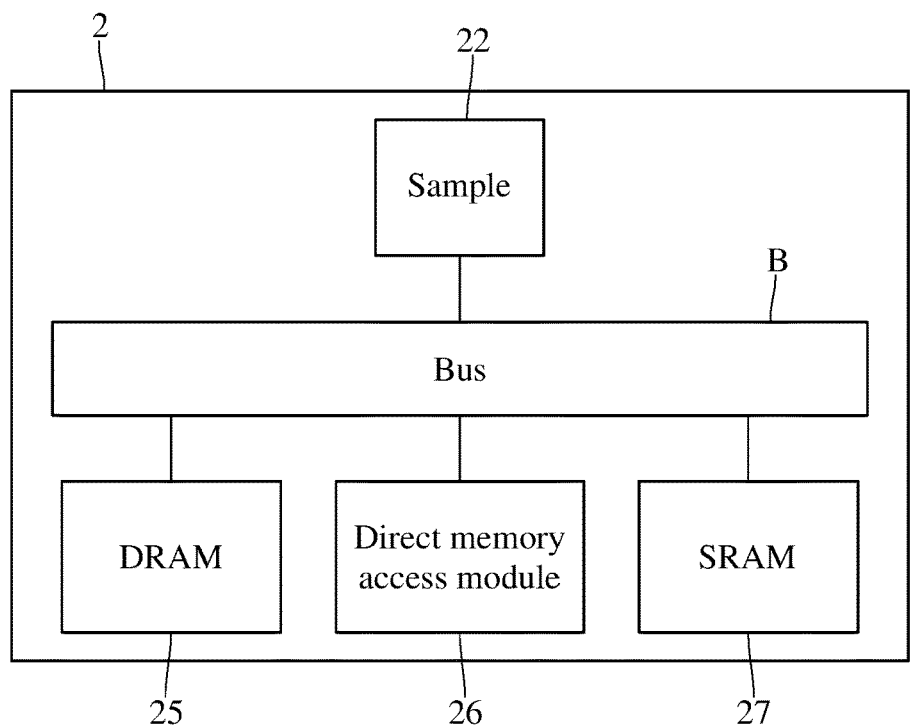
FIG. 1A is a block diagram of a system to be tested according to an embodiment of the present disclosure.
Figure 1B:
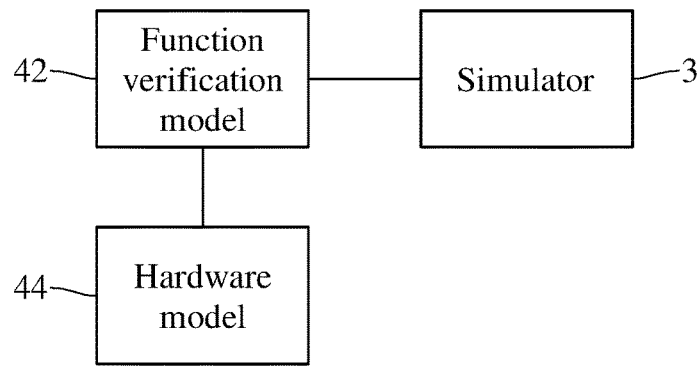
FIG. 1B is a block diagram of a simulation system according to an embodiment of the present disclosure.
Figure 2:
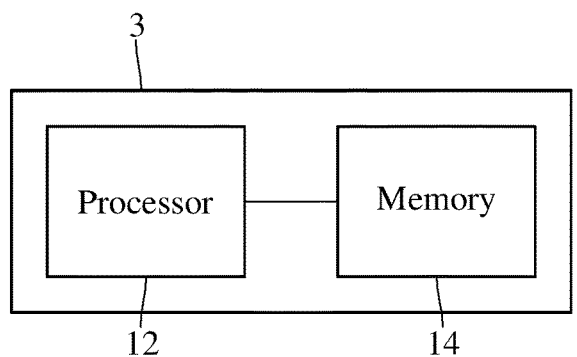
FIG. 2 is a block diagram of the simulator in FIG. 1 according to an embodiment of the present disclosure.

Please refer to FIG. 1A, FIG. 1B and FIG. 2. FIG. 1A is a block diagram of a system to be tested according to an embodiment of the present disclosure, FIG. 1B is a block diagram of a simulation system according to an embodiment of the present disclosure, and FIG. 2 is a block diagram of the simulator in FIG. 1 according to an embodiment of the present disclosure.

As shown in FIG. 2, a simulator 3 includes a processor 12 and a memory 14. The memory is electrically connected to the processor. The memory stores at least one instruction.

When the processor 12 executes the at least one instruction, the simulator 3 performs a timing estimation method.

FIG. 1A shows a configuration of a system to be tested 2. The system to be tested 2 includes a sample 22, a dynamic random access memory 25, a direct memory access module 26, a static random access memory 27, and a bus B. The bus B is electrically connected to the sample 22, the dynamic random access memory 25, the direct memory access module 26, and the static random access memory 27. For example, the sample 22 is a central processing unit (CPU), a graphics processing unit (GPU), an encoder or decoder, and the disclosure is not limited thereto. The bus B can be any construction of data exchange.

As shown in FIG. 1B, the simulator 3 communicates with the function verification model 42. In practice, a function verification model 42 is used to simulate the sample 22, and a hardware model 44 is used to simulate the dynamic random access memory 25, the direct memory access module 26, the static random access memory 27 and the bus B in FIG. 1A. By instructing the simulator 3 to control the function verification model 42 and the hardware model 44 for data transmission, the relative functions and the timing of transmission of at least one sample 22 may be obtained.

Figure 6:
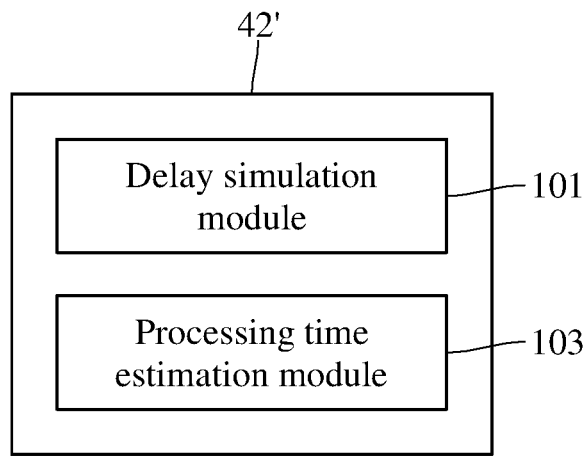
FIG. 6 is a block diagram of a function verification model according to an embodiment of the present disclosure.

Please further refer to FIG. 6 to explain embodiments of a function verification model. FIG. 6 is a block diagram of a function verification model according to an embodiment of the present disclosure. In the embodiment as shown in FIG. 6, a function verification model 42' includes a delay simulation module 101 and a processing time estimation module 103.

The function verification model 42' issues a first access request at a first time point, and then receives a first response to the first access request from the bus B at a second time point. The delay simulation module 101 records the first and second time points and calculates the difference between the first and second time points, which is defined as a delay time.

The processing time estimation module 103 determines whether the delay time is longer than or substantially equal to a transmission time corresponding to the first access request. When the delay time is longer than or substantially equal to the transmission time corresponding to the first access request, the function verification model 42 issues a second access request. When the delay time is shorter than the transmission time corresponding to the first access request, the processing time estimation module 103 issues the second access request in a compensation time following (after) the second time point. The compensation time is not larger than the difference between the transmission time and the delay time.

In an embodiment, when the delay time is longer than or substantially equal to the transmission time, the processing time estimation module 103 further calculates the difference of timeout between the delay time and the transmission time and adds the difference of timeout into a total timeout value. When the delay time is shorter than the transmission time, the processing time estimation module 103 calculates a difference of time-deficit between the delay time and the transmission time. When the total timeout value is larger than 0, the processing time estimation module 103 subtracts a time length equivalent to the difference of time-deficit from the total timeout value, and sets the compensation time to be 0. In practice, when the total timeout value is not larger than 0, the processing time estimation module 103, for example, calculates the difference of time-deficit and sets the difference of time-deficit as the compensation time. For example, the transmission time is an average transmission time for the access requests.

Figure 7:
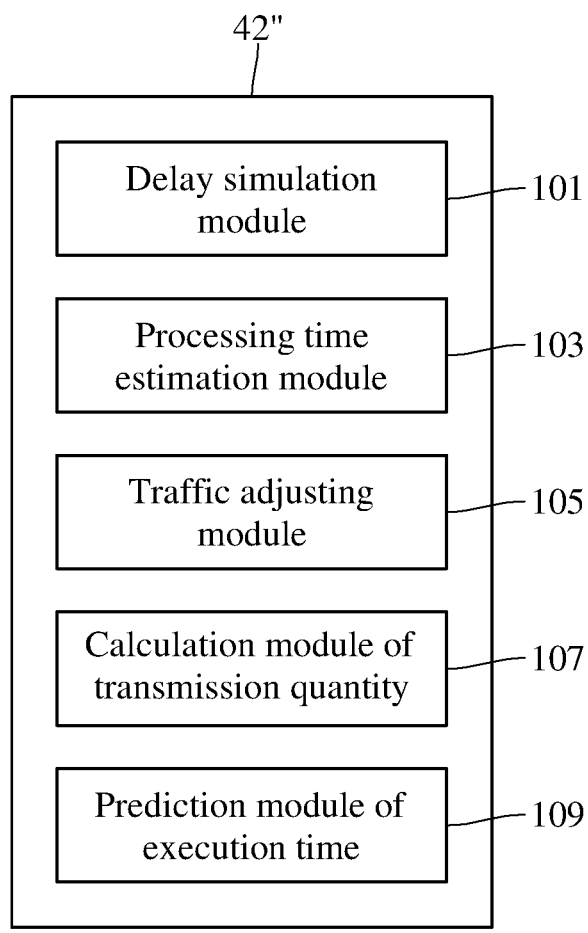
FIG. 7 is a block diagram of a function verification model according to an embodiment of the present disclosure.

Please further refer to FIG. 7 to explain another embodiment of the function verification model. FIG. 7 is a block diagram of a function verification model according to an embodiment of the present disclosure. In the embodiment as shown in FIG. 7, the function verification model 42" issues a plurality of access requests according to a plurality of slices in at least one frame, in order to access the memory through the bus B. The function verification model 42" further includes a prediction module of execution time 109 and a calculation module of transmission quantity 107.

The calculation module of transmission quantity 107 obtains a total amount of access requests corresponding to at least one frame corresponding to access requests. For example, the total amount of access requests indicates the total number of times in reading and writing. In an embodiment, the timing estimation device acquires one or more desired parameters during a time period of configuration setting. In an instance, the calculation module of transmission quantity 107 obtains the total amount of access requests during the time period of configuration setting. In practice, the calculation module of transmission quantity 107 estimates and obtains the total amount of access requests according to, for example, at least one slice type, a resolution of at least one frame or the encoding scheme of the at least one frame corresponding to the access request, or other parameters related to the access request. In another instance, the function verification model 42" runs a whole simulation process during the time period of configuration setting, so as to obtain an actual total amount of access requests. The above described instances or examples are merely for an exemplary illustrative purpose, and the present disclosure is not limited to them.

The prediction module of execution time 109, according to at least one slice type, a resolution of at least one frame or the encoding scheme of the at least one frame that corresponds to the access requests, obtains a total transmission time required by the access requests. The prediction module of execution time 109, according to the total transmission time and the total amount of access requests, obtains an average transmission time of the access requests. As described above, in an embodiment, the average transmission time is set as the transmission time.

In an embodiment, one of the access requests has a first read/write length, and the function verification model has a second read/write length. As shown in FIG. 7, the function verification model 42" in an example further includes a traffic adjusting module 105. The traffic adjusting module 105 determines whether the first read/write length is substantially equal to the second read/write length. When it is determined that the first read/write length is different from the second read/write length, the read/write length for the access request is adjusted to be the second read/write length. For example, the first read/write length is 128 bytes, and the second read/write length is 16 bytes; and in this case, an access request is divided into 8 sub requests each having the second read/write length, and the traffic adjusting module 105 respectively receives each of the sub requests until the entire access request is received. In another embodiment, the first read/write length is 16 bytes, and the second read/write length is 128 bytes; in this case, the function verification model 42" can directly receive the entire access request so that the traffic adjusting module 105 does not need to process the access request or the traffic adjusting module 105 is enabled to collect 8 sub requests of the first read/write length and then issue them as the entire access request to the function verification model.

In practice, the function verification model 42" issues access requests according to slices in at least one frame in order to access the memory through the bus. The prediction module of execution time 109 calculates a power consumption value according to at least one slice type, the resolution of at least one frame or the encoding scheme of the at least one frame and the delay time. The power consumption value is, for example, an average power value or an instantaneous power value.

Figure 3:
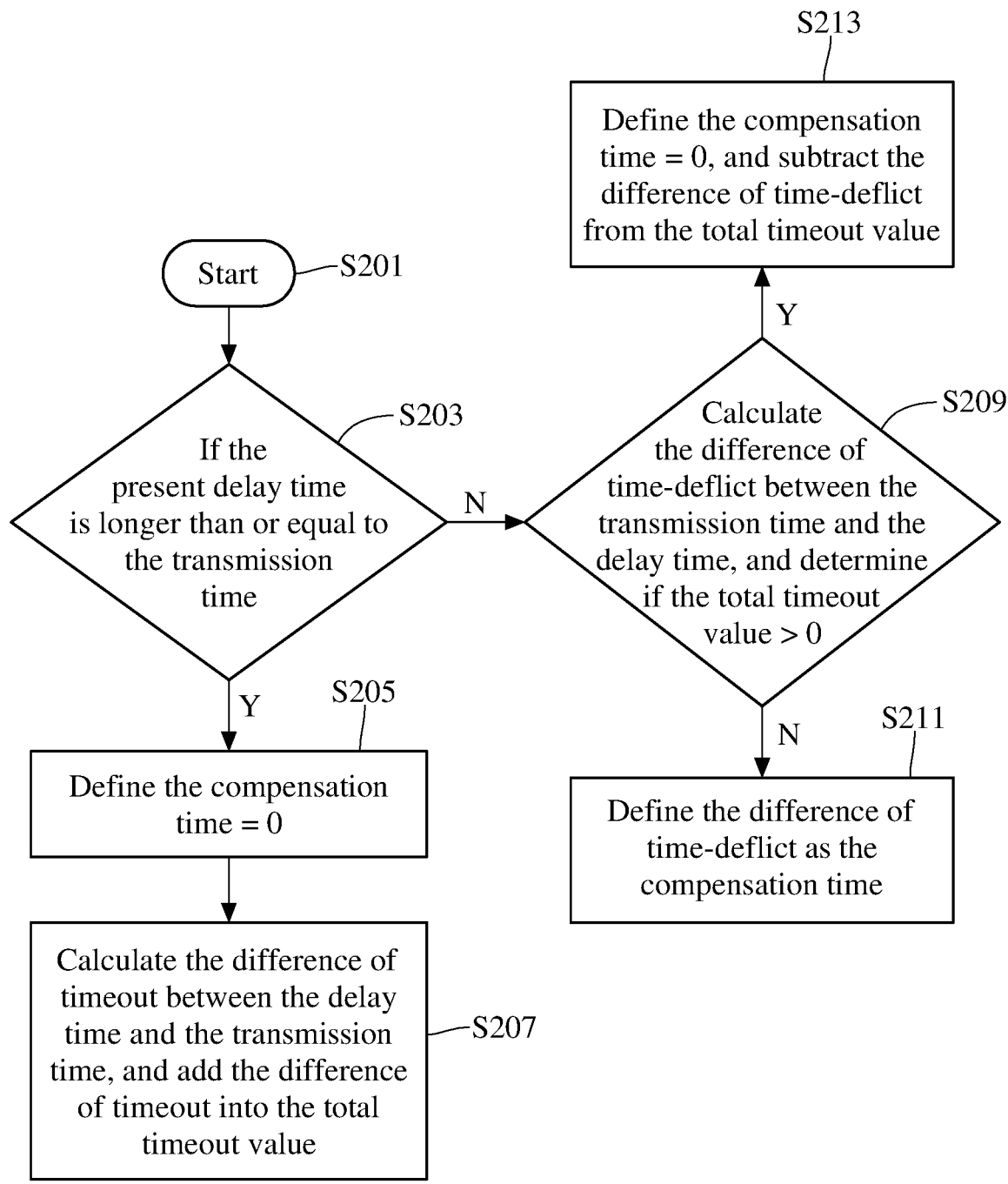
FIG. 3 is a flow chart of a timing estimation method according to an embodiment of the present disclosure.
Figure 4A:
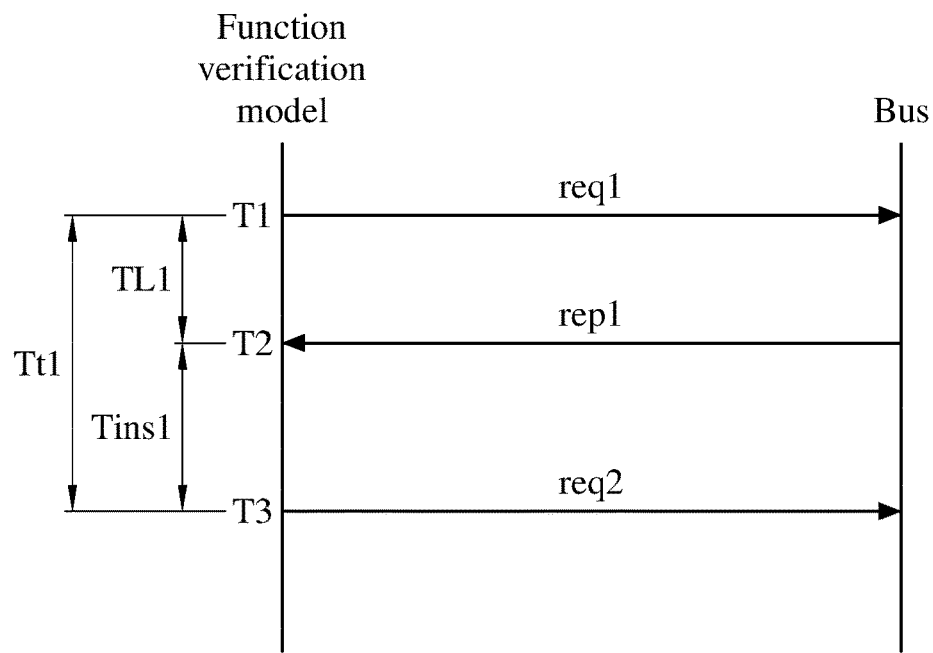
FIG. 4A illustrates a diagram of a timing for a function verification model and a hardware model according to an embodiment of the present disclosure.
Figure 4B:
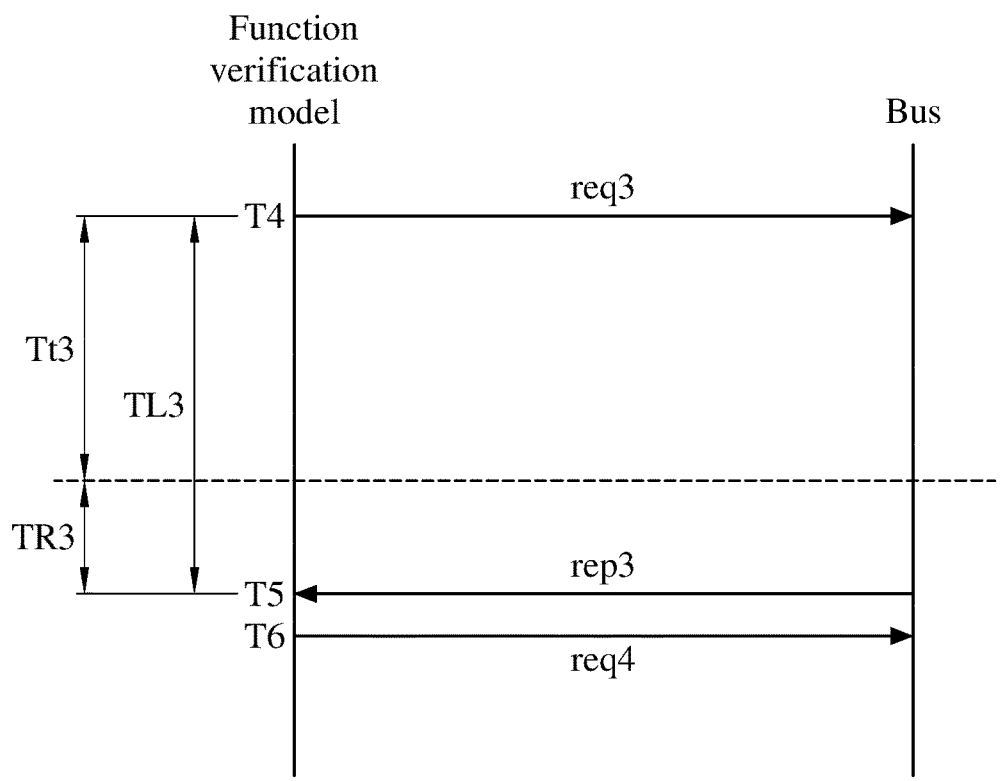
FIG. 4B illustrates a diagram of a timing for a function verification model and a hardware model according to another embodiment of the present disclosure.
Figure 4C:
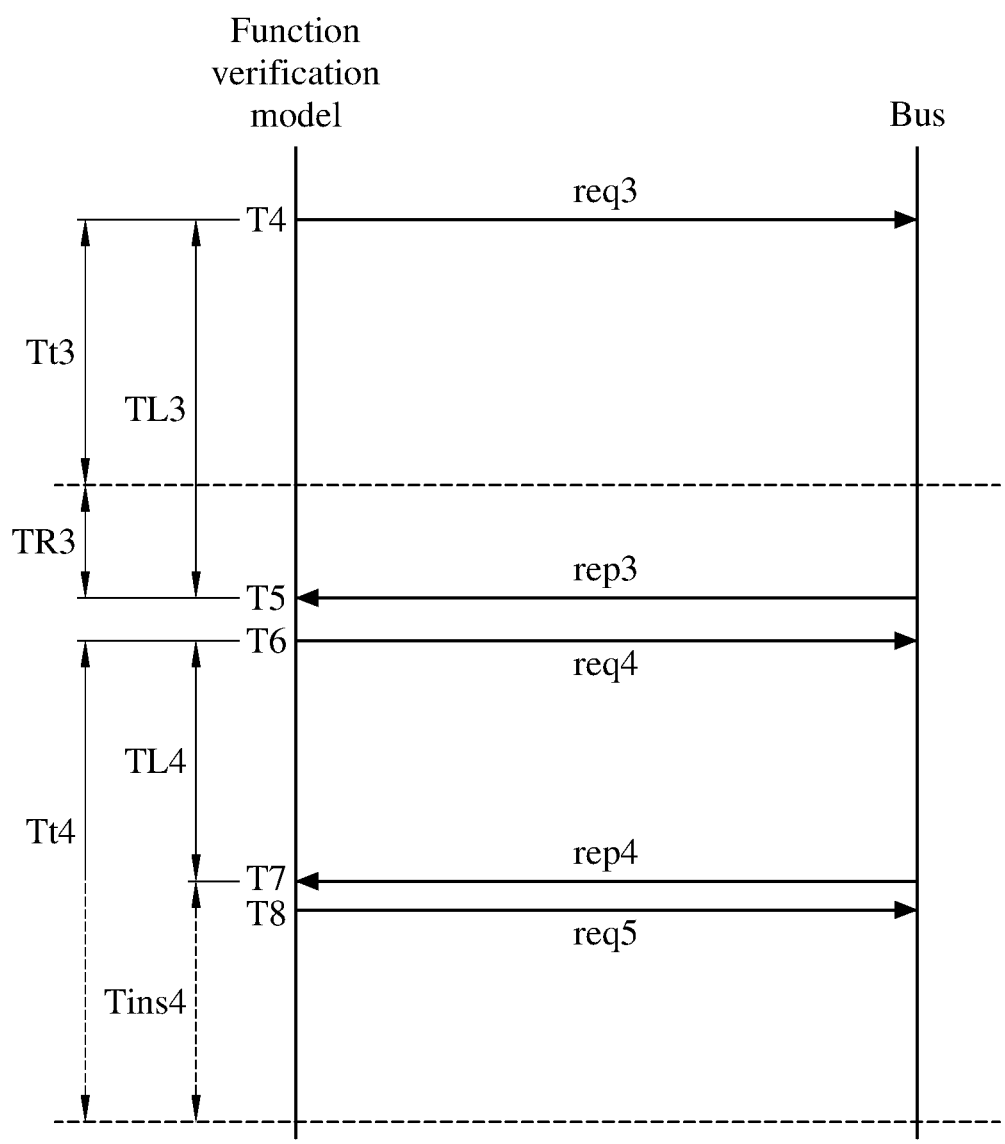
FIG. 4C illustrates a diagram of a timing for a function verification model and a hardware model according to yet another embodiment of the present disclosure.
Figure 4D:
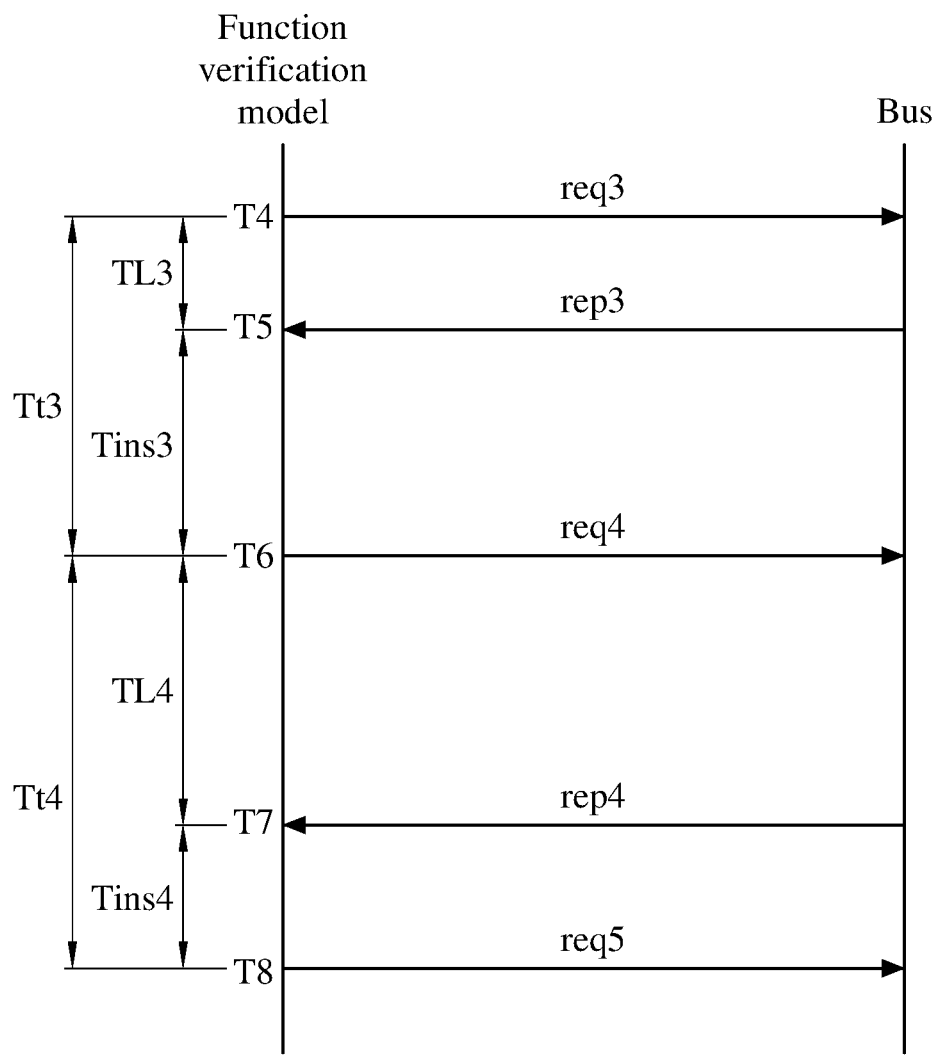
FIG. 4D illustrates a diagram of a timing for a function verification model and a hardware model according to yet another embodiment of the present disclosure.

In the following, examples as shown in FIG. 3 to FIG. 4D are employed to specifically explain the operation of the timing estimation device in timing. First, please refer to FIG. 3. FIG. 3 is a flow chart of a timing estimation method according to an embodiment of the present disclosure. In step S203, it is done to determine whether the present delay time is longer than or substantially equal to a transmission time. If yes, the process proceeds to step S205, in which the compensation time is set to be 0. Then, the process proceeds to step S207, in which it is done to calculate the difference of timeout between the delay time and the transmission time and add the difference of timeout into a total timeout value. In step S203, if it is determined that the present delay time is shorter than the transmission time, the process proceeds to step S209. In step S209, it is done to calculate the difference of time-deficit between the transmission time and the delay time and determine whether the total timeout value is larger than 0. If yes, the process proceeds to step S213. If not, the process proceeds to step S211. In step S211, the difference of time-deficit is set as the compensation time. In step S213, the compensation time is set to be 0, and the difference of time-deficit is subtracted from the total timeout value. The following description will explain situations of different determination results.

Please refer to FIG. 4A. FIG. 4A illustrates a diagram of a timing for a function verification model and a hardware model according to an embodiment of the present disclosure. At the first time point T1, the function verification model 42 issues a first access request req1. At the second time point T2, the first response rep1 to the first access request req1 is received from the hardware model 44. The function verification model 42 calculates the delay time TL1 between the first time point T1 and the second time point T2. In this embodiment, the delay time TL1 is shorter than the transmission time Tt1 corresponding to the first access request req1, so the function verification model 42 issues a second access request req2 at the third time point T3 that is the end of the compensation time following the second time point T2. The compensation time is not larger than the difference between the transmission time Tt and the delay time TL. In this embodiment, the compensation time is substantially equal to the difference of time-deficit Tins1 between the transmission time Tt and the delay time TL; that is, the function verification model 42 issues the second access request req2 in a time period equivalent to the difference of time-deficit Tins1 in time length after the second time point T2. Therefore, a time period between a time point, at which the function verification model 42 issues an access request, and a time point, at which the function verification model 42 finishes receiving a response to the access request, is substantially equal to the transmission time Tt corresponding to the access request.

Then, please refer to FIG. 4B. FIG. 4B illustrates a diagram of a timing for a function verification model and a hardware model according to another embodiment of the present disclosure. At the fourth time point T4, the function verification model 42 issues a third access request req3, and at the fifth time point T4, receives a third response rep3 to the third access request req3. The fourth time point T4 and the fifth time point T5 have a delay time TL3 therebetween. The delay time TL3 is longer than or substantially equal to the transmission time Tt3 corresponding to the third access request req3. In this case, the function verification model 42 further issues a third access request req4. In an embodiment, the function verification model 42 issues a fourth access request req4 at the sixth time point T6. The sixth time point T6 is substantially the same as the fifth time point T5.

As described above, it is possible that the delay time is longer than or substantially equal to the transmission time, or is not larger than the transmission time. That is, it is possible that the delay time and the transmission time have a difference therebetween. In the case where the transmission time is set as a basis, when the delay time is no longer than or substantially equal to transmission time in an embodiment, the function verification model 42 calculates the difference of time-deficit between the delay time and the transmission time, sets the compensation time to be substantially equal to the difference of time-deficit, and subtracts the difference of time-deficit from a total timeout value. Alternatively, when the delay time is longer than or substantially equal to the transmission time corresponding to the access request, the function verification model 42 calculates the difference of timeout between the delay time and the transmission time, adds the difference of timeout into a total timeout value, and sets the compensation time to be 0. The function verification model 42 selectively adjusts the compensation time in the next stage according to the total timeout value. For example, the respective difference described above is an absolute value; and however, the present disclosure is not limited thereto.

One or more specific parameters are exemplified in the following description. For example, the timing estimation device 1 counts out a total timeout value TR (not shown). In the embodiment as shown in FIG. 4A, when the function verification model 42 receives the first response rep1 to the first access request req1 at the second time point T2, the function verification model 42 records it and calculates the difference of time-deficit Tins1 between the delay time TL1 and the transmission time Tt1. Also, the function verification model 42 sets the compensation time to be substantially equal to the difference of time-deficit Tins1. That is, the function verification model 42 issues the second access request req2 in a time period equivalent to the difference of time-deficit Tins1 after receiving the first response rep1. In the embodiment as shown in FIG. 4B, when the function verification model 42 receives the third response rep3 to the third access request req3 at the fifth time point T5, the function verification model 42 records it, calculates the difference of timeout TR3 between the delay time TL3 and the transmission time Tt3, and adds the difference of timeout TR3 into the total timeout value TR.

In practice, the function verification model 42, according to the total timeout value, correspondingly sets the compensation time, or the function verification model 42 updates the total timeout value in various ways. Please refer to FIG. 4C to explain the calculation of the total timeout value. FIG. 4C illustrates a diagram of a timing for a function verification model and a hardware model according to yet another embodiment of the present disclosure. The embodiment as shown in FIG. 4C extends from one of the examples in the embodiment as shown in FIG. 4B. In the embodiment as shown in FIG. 4C, the function verification model 42 issues the fourth access request req4 at the sixth time point T6, and receives the fourth response rep4 to the fourth access request req4 at the seventh time point T7. The delay time TL4 between the sixth time point T6 and the seventh time point T7 is shorter than the transmission time Tt4 corresponding to the fourth access request req4, and there is the difference of time-deficit Tins4 between the delay time TL4 and the transmission time Tt4 corresponding to the fourth access request req4. In practice, the function verification model 42, for example, determines whether the total timeout value TR is larger than 0. In this embodiment, since the total timeout value TR is larger than 0, although the delay time TL4 is not larger than the transmission time Tt4, the compensation time is still set to be 0, and the difference of time-deficit is subtracted from the total timeout value. That is, the function verification model 42 issues the fifth access request req5 at the eighth time point T8, and the eighth time point T8 is substantially the same as the seventh time point T7, or the eighth time point T8 immediately follows the seventh time point T7.

Please refer to FIG. 4D. FIG. 4D illustrates a diagram of a timing for a function verification model and a hardware model according to yet another embodiment of the present disclosure. In the embodiment as shown in FIG. 4D, the function verification model 42 issues the fourth access request req4 at the sixth time point T6, and receives the fourth response rep4 to the fourth access request req4 at the seventh time point T7. The delay time TL4 between the sixth time point T6 and the seventh time point T7 is shorter than the transmission time Tt4 corresponding to the fourth access request req4, and the delay time TL4 and transmission time Tt4 corresponding to the fourth access request req4 have a difference of time-deficit Tins4 therebetween. In practice, the function verification model 42, for example, further determines whether the total timeout value TR is larger than 0. In this embodiment, the total timeout value TR is substantially equal to 0 or is a negative value, so that the function verification model 42 sets the difference of time-deficit Tins4 as the compensation time.

The foregoing transmission times Tt1~Tt4 can be different or the same. In an embodiment, said transmission time is an average transmission time of transmission times respectively corresponding to read/write instructions. In an embodiment, the function verification model 42 issues a plurality of access requests according to a plurality of slices in at least one frame, and each slice corresponds to at least one of the issues. The function verification model 42, according to at least one slice type, the resolution of at least one frame or the encoding scheme of the at least one frame, obtains a total transmission time for the access requests, and obtains a total amount of access requests corresponding to the at least one frame. The function verification model 42 obtains an average transmission time of the access requests according to the total transmission time and the total amount of access requests. Said encoding scheme is, for example, H.264; and when the encoding scheme is H.264, the slice type is, for example, an I type, P type or B type. The above description is merely for an illustrative purpose, and the function verification model 42 provided in the present disclosure is not limited to the above embodiments as well as such a verification manner based on one or more frames.

In an embodiment, when the function verification model 42, such as the encoder 23, accesses data stored in the dynamic random access memory 25 through the bus B for data encoding, the function verification model 42 calculates a power consumption value in the encoding process according to at least one slice type, the resolution of at least one frame or the encoding scheme of the at least one frame and the delay time. This power consumption value is an average power value or an instantaneous power value in an instance.

Figure 5:
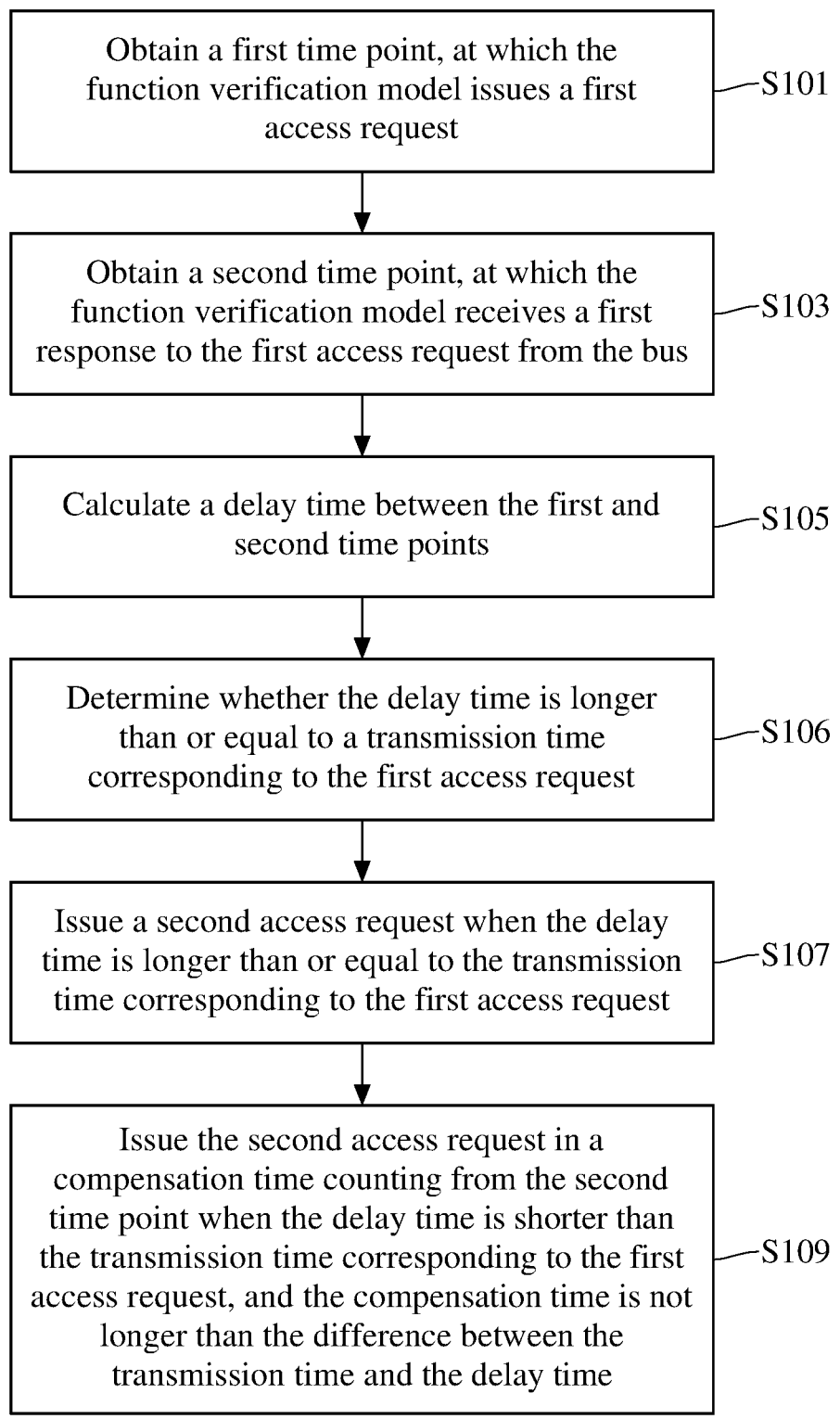
FIG. 5 is a flow chart of a timing estimation method according to an embodiment of the present disclosure.

As set forth above, the present disclosure provides a timing estimation method, which will be explained by referring to FIG. 5. FIG. 5 is a flow chart of a timing estimation method according to an embodiment of the present disclosure. The timing estimation method is applied to estimate the performance of the function verification model 42 in the system to be tested 2. The function verification model 42 issues a number of access requests according to a number of slices in at least one frame, in order to access the memory via the bus. As shown in the figure, in step S111, it is done to obtain an average time period for the access requests according to a total transmission time and a total amount of access requests. In step S101, it is done that the function verification model 42 issues a first access request at a first time point. In step S103, it is done to receive a first response to the first access request from the bus at the second time point. In step S105, it is done to calculate the delay time between the first time point and the second time point. In step S107, it is done to issue a second access request when the delay time is longer than or substantially equal to a transmission time corresponding to the first access request in step S106. In step S109, it is done to issue a second access request in a compensation time following the second time point when the delay time is shorter than the transmission time corresponding to the first access request in step S106. The compensation time is not larger than the difference between the transmission time and the delay time.

To sum up, the present disclosure provides a timing estimation method and a simulator. In an embodiment, the present disclosure is based on a functional model without time information, and exemplifies how to correspondingly present the execution time period and a degree of power consumption according to various parameters and various data formats. Furthermore, the timing estimation method and the simulator provided in the present disclosure may be applied to various specific hardware configurations, and thus, may be able to be easily applied mechanically to any video processing unit fitting in the standard. Through the timing estimation method and the simulator provided in the present disclosure, it is possible that obtaining information about time and power consumption takes merely a couple of weeks. Also, a user may be allowed to dynamically adjust the video processing unit (VPU) speed according to the present traffic of the system. In an example, if the present system traffic is very busy, the quantity of data to be processed will be decreased in order to reduce the loading of the entire system; and otherwise, if the system has an abundant time to process a task, the speed of processing will be increased. Since there may be a quite large difference in response time and power consumption between such two opposite situations, this fact should be taken into account for a reference condition. In addition, the timing estimation method and the simulator provided in the present disclosure also allow the user to personally define some specific parameters for the inputs of various video processing components. Therefore, the present disclosure may have good flexibility and may be able to satisfy users' various requirements.

What is claimed is:

1. A timing estimation method, applied to a function verification model for issuing access requests to simulate a situation in which a memory is accessed via a bus wherein each slice corresponds to at least one of the access requests, and the timing estimation method comprising:
obtaining a first time point, at which the function verification model issues a first access request;

obtaining a second time point, at which the function verification model receives a first response to the first access request from the bus;

calculating a delay time between the first time point and the second time point;

determining whether the delay time is longer than or substantially equal to a transmission time corresponding to the first access request;

the function verification model issuing a second access request when the delay time is longer than or substantially equal to the transmission time corresponding to the first access request, the function verification model issuing the second access request in a compensation time counting from the second time point when the delay time is shorter than the transmission time corresponding to the first access request, wherein the compensation time is no longer than a difference between the transmission time and the delay time;

obtaining a total transmission time for the access requests according to at least one slice type, a resolution of at least one frame or encoding scheme of the at least one frame that corresponds to the access requests;

obtaining a total amount of access requests corresponding to the at least one frame;

obtaining an average transmission time for the access requests according to the total transmission time and the total amount of access requests; and calculating a power consumption value according to the at least one slice type, the resolution of at least one frame or the encoding scheme of the at least one frame and the delay times.

2. The timing estimation method according to claim 1, further comprising when the delay time is longer than or substantially equal to the transmission time corresponding to the first access request:

calculating a difference of timeout between the delay time and the transmission time; and adding the difference of timeout into a total timeout value.

3. The timing estimation method according to claim 1, further comprising when the delay time is shorter than the transmission time corresponding to the first access request:

calculating a difference of time-deficit between the transmission time and the delay time;

determining whether a total timeout value is larger than 0;

defining the compensation time to be 0 and subtracting the difference of time-deficit from the total timeout value when the total timeout value is larger than 0; and defining the difference of time-deficit as the compensation time when the total timeout value is not larger than 0.

4. The timing estimation method according to claim 1, wherein one of the access requests has a first read/write length, the function verification model has a second read/write length, and the timing estimation method further comprises:

determining whether the first read/write length is equal to the second read/write length; and adjusting read/write length of the access requests to be the second read/write length when the first read/write length is not equal to the second read/write length.

5. A simulator, comprising:

a processor; and a memory, electrically connected to the processor and configured to store at least one instruction;

wherein when the processor executes the at least one instruction, the processor performs a timing estimation method applied to a function verification model for issuing access requests to simulate a situation in which the memory is accessed via a bus, and in the timing estimation method, wherein each slice corresponds to at least one of the access requests, and the processor performs:

obtaining a first time point, at which the function verification model issues a first access request;

obtaining a second time point, at which the function verification model receives a first response to the first access request from the bus;

calculating a delay time between the first time point and the second time point;

determining whether the delay time is longer than or substantially equal to a transmission time corresponding to the first access request;

by the function verification model, issuing a second access request when the delay time is longer than or substantially equal to the transmission time corresponding to the first access request;

by the function verification model, issuing the second access request in a compensation time counting from the second time point when the delay time is shorter than the transmission time corresponding to the first access request, wherein the compensation time is no longer than a difference between the transmission time and the delay time;

obtaining a total transmission time for the access requests according to at least one slice type, a resolution of at least one frame or encoding scheme of the at least one frame that corresponds to the access requests;

obtaining a total amount of access requests corresponding to the at least one frame;

obtaining an average transmission time for the access requests according to the total transmission time and the total amount of access requests; and calculating a power consumption value according to the at least one slice type, the resolution of at least one frame or the encoding scheme of the at least one frame and the delay times.

6. The simulator according to claim 5, wherein when the delay time is longer than or substantially equal to the transmission time corresponding to the first access request, the processor further performs:

calculating a difference of timeout between the delay time and the transmission time; and adding the difference of timeout into a total timeout value.

7. The simulator according to claim 5, wherein when the delay time is shorter than the transmission time corresponding to the first access request, the processor further performs:

calculating a difference of time-deficit between the transmission time and the delay time;

determining whether a total timeout value is larger than 0;

defining the compensation time to be 0 and subtracting the difference of time-deficit from the total timeout value when the total timeout value is larger than 0; and defining the difference of time-deficit as the compensation time when the total timeout value is not larger than 0.

8. The simulator according to claim 5, wherein one of the access requests has a first read/write length, the function verification model has a second read/write length, and the processor further performs:

determining whether the first read/write length is equal to the second read/write length; and adjusting read/write length of the access requests to be the second read/write length when the first read/write length is not equal to the second read/write length.

* * * * *